(12) United States Patent
Jensen et al.

(10) Patent No.: US 6,375,130 B1
(45) Date of Patent: Apr. 23, 2002

(54) CORE SPRAY UPPER T-BOX CLAMP

(75) Inventors: Grant Clark Jensen, Morgan Hill; Bettadapur Narayanarao Sridhar, Cupertino, both of CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/128,286

(22) Filed: Aug. 3, 1998

(51) Int. Cl.[7] ................................................. F16L 3/08
(52) U.S. Cl. ........................ 248/74.1; 248/74.4; 248/65
(58) Field of Search ............................... 248/65, 49, 61, 248/74.1, 74.4, 316.1, 230.1, 67.7

(56) References Cited

U.S. PATENT DOCUMENTS

| | | | | |
|---|---|---|---|---|
| 2,547,932 A | * | 4/1951 | Downs, Jr. ................ | 248/74.4 |
| 3,841,593 A | * | 10/1974 | Muto et al. ................ | 248/146 |
| 4,249,610 A | * | 2/1981 | Loland ........................ | 166/360 |
| 4,804,158 A | * | 2/1989 | Collins et al. ............. | 248/74.4 |
| 4,946,117 A | * | 8/1990 | Liesegang ................... | 248/65 |
| 4,978,090 A | * | 12/1990 | Wichert et al. ............ | 248/74.1 |
| 5,237,909 A | * | 8/1993 | Pirhadi ........................ | 92/161 |
| 5,839,192 A | * | 11/1998 | Weems et al. ........... | 29/402.14 |
| 5,964,029 A | * | 10/1999 | Weems et al. ................ | 29/723 |
| 6,131,962 A | * | 10/2000 | Weems et al. ............... | 285/337 |

\* cited by examiner

Primary Examiner—Kimberly T. Wood
(74) Attorney, Agent, or Firm—Armstrong Teasdale LLP

(57) ABSTRACT

A T-box clamp apparatus which applies compressive forces to a T-box in a boiling water nuclear reactor pressure vessel is described. The T-box clamp apparatus clamps to the T-box and distribution header pipes to hold the distribution headers in place and in contact with the T-box. The T-box clamp apparatus includes a first and a second of clamp assembly and a clamp strong-back assembly coupled to the first and second clamp assemblies. Each clamp assembly includes upper and lower clamp bodies that are coupled to a distribution header pipe. The strong-back assembly includes an upper and a lower strong-back body configured to engage the T-box, with the upper strong-back body coupled to the upper clamp bodies of the first and second clamp assemblies, and the lower strong-back body is coupled to the lower clamp bodies of the first and second clamp assemblies.

19 Claims, 3 Drawing Sheets

CORE SPRAY UPPER T-BOX CLAMP

FIELD OF THE INVENTION

This invention relates generally to nuclear reactors and more particularly, to apparatus and methods for repairing piping within reactor pressure vessels of such reactors.

BACKGROUND OF THE INVENTION

A reactor pressure vessel (RPV) of a boiling water reactor (BWR) typically has a generally cylindrical shape and is closed at both ends, e.g., by a bottom head and a removable top head. A core shroud, or shroud, typically surrounds the core and is supported by a shroud support structure.

Boiling water reactors have numerous piping systems, and such piping systems are utilized, for example, to transport water throughout the RPV. For example, core spray piping is used to deliver water from outside the RPV to core spray spargers inside the RPV. The core spray piping and spargers deliver water flow to the reactor core.

Intergranular stress corrosion cracking (IGSCC) is a known phenomenon occurring in reactor components, such as structural members, piping, fasteners, and welds, exposed to high temperature water. The reactor components are subject to a variety of stresses associated with, for example, differences in thermal expansion, the operating pressure needed for the containment of the reactor cooling water, and other sources such as residual stresses from welding, cold working and other inhomogeneous metal treatments. In addition, water chemistry, welding, heat treatment and radiation can increase the susceptibility of metal in a component to IGSCC.

Conditions exist in the reactor which contribute to IGSCC of the core spray piping. One area of susceptibility in the core spray piping is the welded joints between the upper T-box and its associated distribution headers. The upper T-box is the junction where the core spray supply header branches to distribution header pipes. The core spray system prevents excessive fuel clad temperature in the event of a Loss of Coolant Accident (LOCA) by delivering cooling water to the core region of the reactor. In the event that through-wall circumferential cracking should occur at these welded joints, the system may be compromised.

In order to prevent unacceptable leakage and to ensure that the core spray system delivers the necessary volumetric flow rate to the reactor core, it would be desirable to provide a clamping system to provide structural integrity to the T-box and to hold the welded joints together in the event that one or more welds fail.

SUMMARY OF THE INVENTION

These and other objects may be attained by a T-box clamp apparatus which applies compressive forces to the T-box welded joints to hold the distribution headers in place and in contact with the T-box. The T-box clamp apparatus includes a first and a second clamp assembly and a clamp strong-back assembly coupled to the first and second clamp assemblies.

The first and second clamp assemblies each include an upper clamp body, a lower clamp body, and a clamp bolt and nut assembly. The upper and lower clamp bodies are configured to conform to the curvature of the header pipes. Each upper and lower clamp body also includes a clamp bolt opening extending through the clamp body and configured to receive the clamp bolt. Particularly, each upper and lower clamp body has a flat side and a curved side configured to conform to the header pipe. The flat side includes a flange depending from the clamp body. The flange is located so as to divide the flat side into two flat portions. One of the flat portions includes a groove extending longitudinally from the end of the clamp body to the flange.

The strong-back assembly includes an upper strong-back body, a lower strong-back body, and a cover plate. The upper strong-back body is configured to conform to the T-box and to couple to the upper clamp body of the first and the second clamp assemblies. The lower strong-back body is configured to conform to the T-box and to couple to the lower clamp body of the first and of the second clamp assemblies. Particularly, each strong-back body includes an elongate member having a curved middle portion and two flat end portions. The inner side of the curved middle portion is configured to conform to the T-box. Each edge portion includes a tongue extending longitudinally from the outer side of the edge portions. Each tongue of the upper strong-back body is configured to engage the groove of an upper clamp body to form a tongue and groove joint. Each tongue of the lower strong-back body is configured to engage the groove of a lower clamp body to form a tongue and groove joint. Each upper clamp body is coupled to the upper strong-back body by a cross-bolt, and each lower clamp body is coupled to the lower strong-back body with a cross-bolt. Particularly, the flange of each clamp body includes a bolt opening extending through the flange. The bolt opening is configured to receive a cross-bolt and to be in substantial alignment with a bolt opening located at each end of the upper and lower strongback bodies. Each strongback body bolt opening is configured to threadingly engage a cross-bolt.

The T-box clamp apparatus also includes a cover plate configured to engage the welded cover of the T-box. The cover plate is flat having a substantially cross shape and is configured to couple to the upper and the lower strong-back bodies. Particularly, cover bolts extend through bolt openings in the cover plate. The bolt openings are configured to align with threaded bolt openings in the upper and the lower strong-back body. The cross shape of the cover plate permits for visual inspection of over one-half of the T-box cover weld.

To assemble the T-box clamp apparatus on the upper T-box in a boiling water nuclear reactor, a hole is first machined in each distribution header pipe extending from the upper T-box. The holes are located adjacent the T-box and are configured so as to align with the clamp bolt openings in the clamp bodies of the clamp assemblies and to receive a clamp bolt. The upper and lower clamp bodies of each clamp assembly are then positioned on the distribution header pipes and each clamp assembly is clamped to a distribution header pipe by a clamp bolt and nut assembly.

The upper strong-back body is positioned adjacent the T-box so that the tongue on each end engages a groove of an upper clamp body. The upper strongback body is coupled to each upper clamp body with a cross bolt. The cross-bolt extends through the bolt opening in the flange of the upper clamp body and threadingly engages the bolt opening in the end of the upper strong-back body. Likewise, the lower strong-back body is positioned adjacent the T-box so that the tongue on each end engages a groove of a lower clamp body. The lower strongback body is coupled to each lower clamp body with a cross bolt. The cross-bolt extends through the bolt opening in the flange of the lower clamp body and threadingly engages the bolt opening in the end of the lower strong-back body. The cover plate is then coupled to the upper and the lower strong-back body with cover bolts that extend through bolt openings in the cover plate and threadingly engages the corresponding bolt openings in the upper and the lower strong-back bodies.

The above described T-box clamp apparatus provides structural integrity to the T-box and the joints between the T-box and the distribution header pipes. The T-box clamp apparatus applies compressive forces to the T-box welded joints to hold the joints together in the event that one or more welds fail, and therefore ensures that the core spray system delivers the necessary volumetric flowrate to the reactor core in the event of a loss of coolant accident.

DETAILED DESCRIPTION

Figure 1:
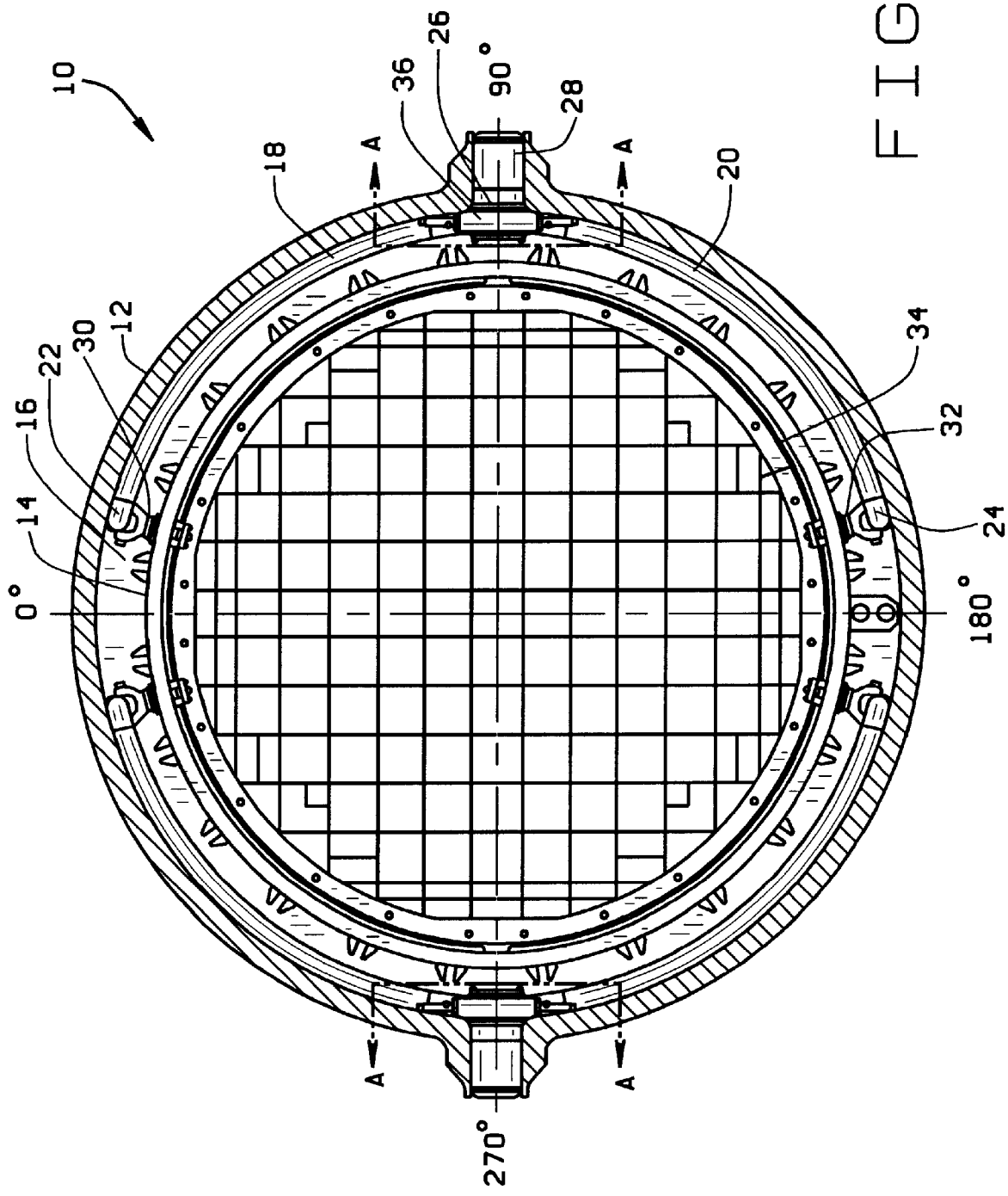
FIG. 1 is a top sectional view of a boiling water nuclear reactor pressure vessel illustrating a T-box clamp apparatus in accordance with one embodiment of the present invention.

FIG. 1 is a top sectional view of a boiling water nuclear reactor pressure vessel 10. Reactor pressure vessel 10 includes a vessel wall 12 and a shroud 14 which surrounds the reactor core (not shown) of pressure vessel 10. An annulus 16 is formed between vessel wall 12 and shroud 14. The space inside annulus 16 is limited with most reactor support piping located inside annulus 16.

Cooling water is delivered to the reactor core during a loss of coolant accident through core spray distribution header pipes 18 and 20 which are connected to downcomer pipes 22 and 24 respectively. Distribution header pipes 18 and 20 diverge from an upper T-box junction 26 which is connected to a core spray cooling water supply header 28. Downcomer pipes 22 and 24 are connected to shroud 14 through lower T-boxes 30 and 32 respectively, which are attached to shroud 14 and an internal sparger 34.

An upper T-box clamp apparatus 36 in accordance with an embodiment of the present invention is clamped to T-box 26. Apparatus 36 is configured to provide structural integrity to upper T-box 26 and to hold distribution header pipes 18 and 20 to T-box 26 in the event of a weld failure.

Figure 2:
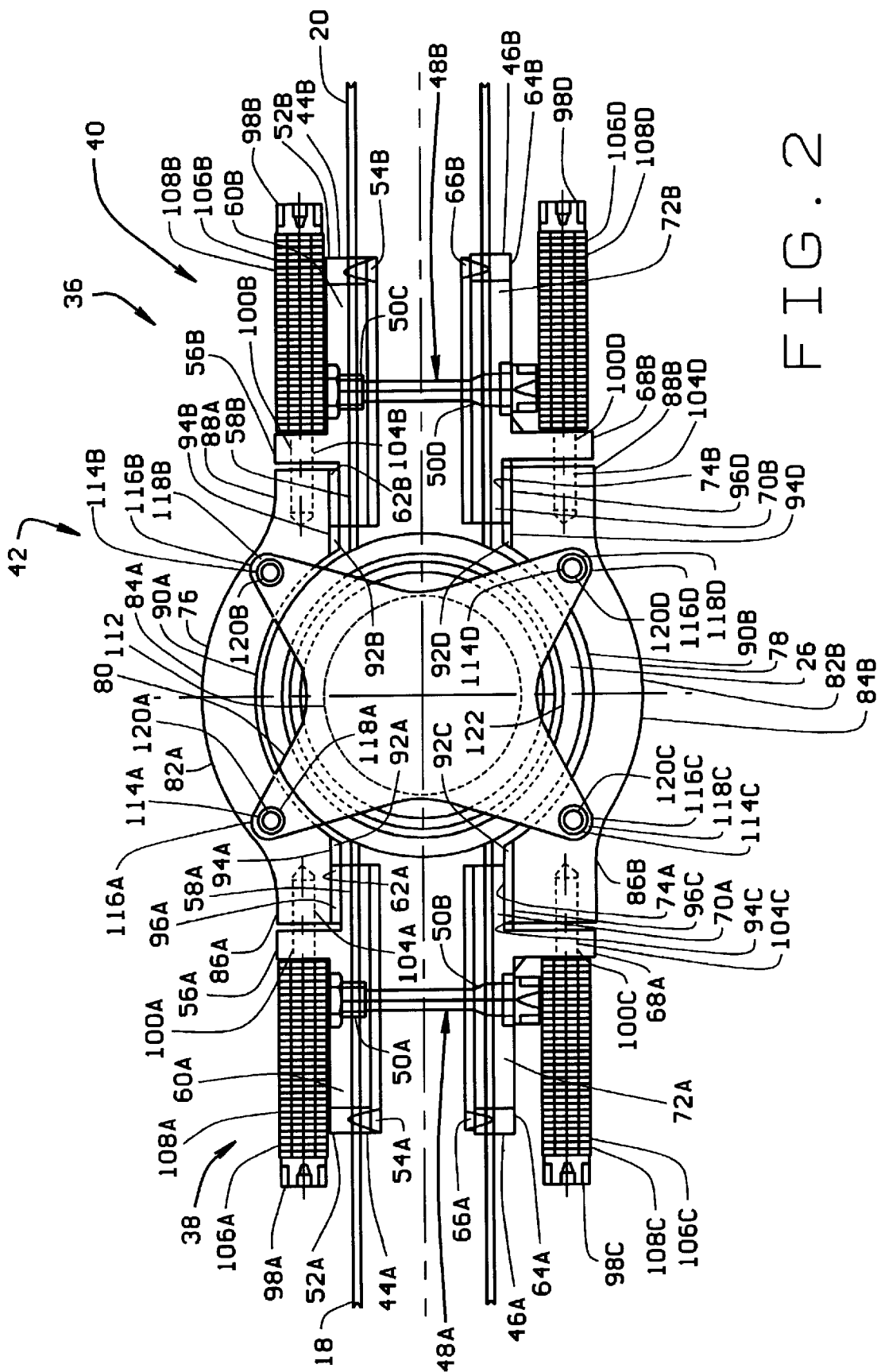
FIG. 2 is a side view of the T-box clamp apparatus shown in FIG. 1.
Figure 3:
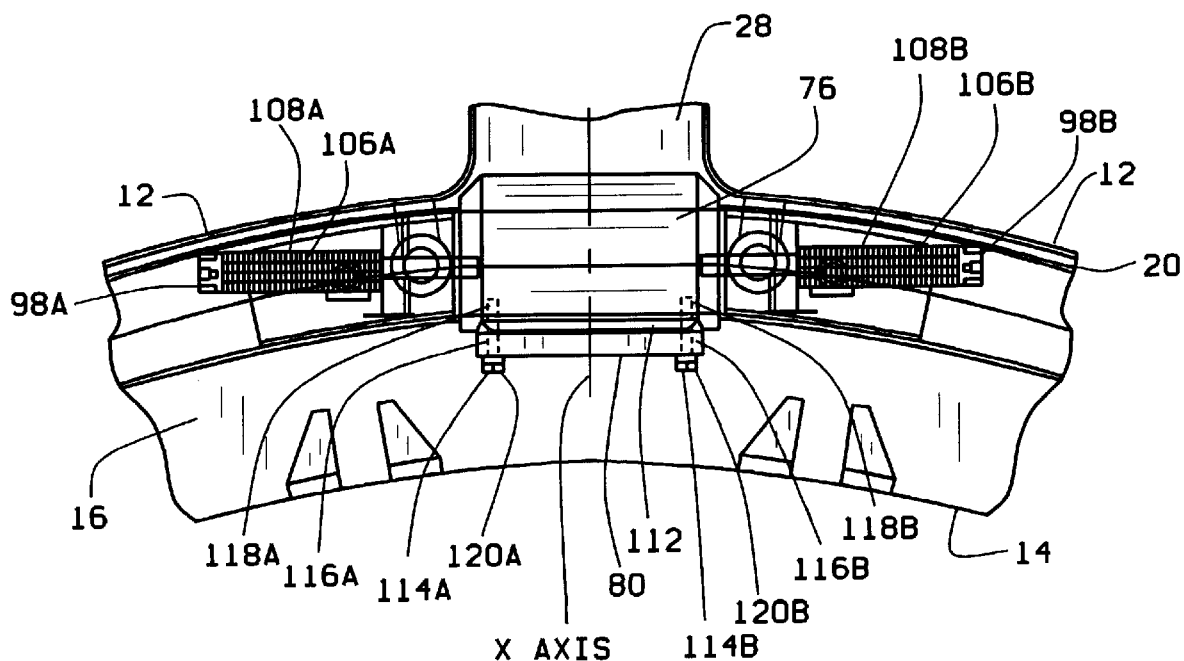
FIG. 3 is a top view of the T-box clamp apparatus shown in FIG. 1.

Referring to FIGS. 2 and 3, upper T-box clamp apparatus 36 includes a first clamp assembly 38, a second clamp assembly 40, and a strong-back assembly 42 coupled to first and second clamp assemblies 38 and 40. First clamp assembly 38 is configured to clamp to distribution header pipe 18 and second clamp assembly is configured to clamp to header pipe 20. Particularly, clamp assemblies 38 and 40 respectively include upper clamp bodies 44A and 44B, lower clamp bodies 46A and 46B, and clamp bolt and nut assemblies 48A and 48B. Bolt assembly 48A is configured to clamp upper and lower clamp bodies 44A and 46A to pipe 18. Bolt assembly 48B is configured to clamp upper and lower clamp bodies 44B and 46B to pipe 20. Bolt openings 50A and 50B extend through clamp bodies 44A and 46A respectively, and bolt openings 50C and 50D extend through clamp bodies 44B and 46B respectively.

Upper clamp body 44A has a flat side 52A and a curved side 54A configured to conform to header pipe 18. Upper clamp body 44B has a flat side 52B and a curved side 54B configured to conform to header pipe 20. Flanges 56A and 56B depend from flat sides 52A and 52B respectively, and are located so as to divide sides 52A and 52B into portions 58A and 58B, and 60A and 60B respectively. Portions 58A and 58B include grooves 62A and 62B extending longitudinally from flanges 56A and 56B to the end of clamp bodies 44A and 44B respectively. Likewise, lower clamp bodies 46A and 46B respectively have flat sides 64A and 64B, curved sides 66A and 66B configured to conform to headers 18 and 20 respectively, flanges 68A and 68B depending from flat side 64A and 64B and dividing sides 64A and 64B into flat portions 70A and 70B, and 72A and 72B respectively. Portions 70A and 70B include grooves 74A and 74B extending longitudinally from flange 68A and 68B to the end of clamp bodies 46A and 46B respectively.

Strong-back assembly 42 includes an upper strong-back body 76, a lower strong-back body 78, and a cover plate 80. Upper strong-back body 76 is configured to conform to T-box 26 and to couple to upper clamp bodies 44A and 44B. Lower strong-back body 78 is configured to conform to T-box 26 and to couple to lower clamp bodies 46A and 46B. Particularly, strong-back bodies 76 and 78 include elongate members 82A and 82B respectively. Members 82A and 82B include curved middle portions 84A and 84B respectively and flat end portions 86A, 86B, 88A, and 88B respectively. Inner sides 90A and 90B of curved middle portions 84A and 84B are configured to conform to T-box 26. Tongues 92A, 92B, 92C, 92D extend longitudinally from inner sides 94A, 94B, 94C, and 94D of end portions 86A, 86B, 88A, and 88B respectively. Tongues 92A and 92B are configured to engage grooves 62A and 62B of upper clamp bodies 44A and 44B to form tongue and groove joints 96A and 96B. Tongues 92C and 92D are configured to engage grooves 74A and 74B of lower clamp bodies 46A and 46B to form tongue and groove joints 96C and 96D. Tongue and groove joints 96A, 96B, 96C, and 96D permit movement of first and second clamp assemblies 38 and 40, with respect to strong-back assembly 42 in a direction that is coaxial with (x-axis) distribution header pipes 18 and 20, but prevent bending about the y-axis.

Upper clamp bodies 44A and 44B are coupled to upper strong-back body 76 with cross-bolts 98A and 98B, and lower clamp bodies 46A and 46B are coupled to lower strong-back body 78 with cross-bolt 98C and 98D respectively. Particularly, bolt openings 100A, 100B, 100C, 100D extend through flanges 56A, 56B, 68A, and 68B respectively. Bolt openings 100A, 100B, 100C, 100D are configured to receive cross-bolts 98A, 98B, 98C, and 98D, and to be in substantial alignment with bolt openings 104A, 104B, 104C, and 104D located in ends 86A, 86B, 88A, and 88B of upper and lower strong-back bodies 76 and 78 respectively. Strong-back body bolt openings 104A, 104B, 104C, and 104D are configured to threadingly engage cross-bolts 98A, 98B, 98C, and 98D.

To maintain compressive forces on T-box 26 during injection of cold water through core spray distribution header pipes, and to prevent bending of clamp apparatus 10 about the Z-axis, belleville washer stacks 106A, 106B, 106C, and 106D are coupled to cross-bolts 98A, 98B, 98C, and 98D and are configured to engage flanges 56A, 56B, 68A, and 68B respectively. Belleville washer stacks 106A, 106B, 106C, and 106D are held in proper alignment by cross-bolts 98A, 98B, 98C, and 98D and are enclosed in covers 108A, 108B, 108C, and 108D. Covers 108A, 108B, 108C, and 108D are crimped to bolts 98A, 98B, 98C, and 98D to prevent loosening. Belleville spring washers, also known as coned-disc springs or belleville disc springs are well known in the art. Belleville washers maintain a constant force regardless of dimensional variations due to wear, temperature changes or tolerances. A plurality of belleville washers are typically stacked together to form a stack. Because of the conical shape of the belleville washer, the washers may be stacked in parallel (all washer stacked in the same direction), in series (washers in stack alternate convex surface and concave surface facing the bolt head), and combination parallel and series. In one embodiment of the present invention, belleville washer stacks 106A, 106B, 106C, and 106D are configured in a combination parallel and series arrangement. In a specific embodiment, belleville washer stacks 106A, 106B, 106C, and 106D contain 30 belleville washers and are configured in a combination parallel and series arrangement with alternating six washer parallel stacks with the convex surfaces facing bolt heads 98A, 98B, 98C, and 98D, then with the concave surfaces facing bolt heads 98A, 98B, 98C, and 98D.

T-box clamp apparatus 36 also includes a cover plate 80 configured to engage a cover 112 of T-box 26. Cover plate 80 is flat, has a substantially cross shape, and is configured to couple to upper and lower strong-back bodies 76 and 78. Particularly, cover bolts 114A, 114B, 114C, and 114D extend through bolt openings 116A, 116B, 116C, and 116D respectively in cover plate 80. Bolt openings 116A, 116B, 116C, and 116D are configured to align with threaded bolt openings 118A, 118B, 118C, and 118D in upper and lower strong-back bodies 76 and 78. Crimp collars 120A, 120B, 120C, and 120D are coupled to cover bolts 114A, 114B, 114C, and 114D to prevent cover bolts 114A, 114B, 114C, and 114D from loosening because of normal operational reactor vibrations. The cross shape of cover plate 80 permits for visual inspection of over one-half of T-box cover weld 122.

Figure 4:
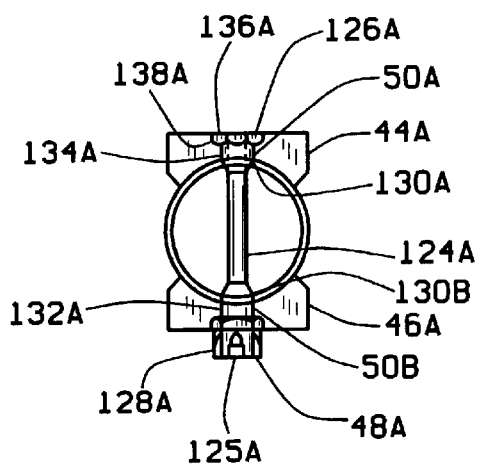
FIG. 4 is a cross sectional view of a first clamp assembly shown in FIG. 2.

Referring to FIG. 4, clamp bolt assembly 48A extends through upper clamp body 44A, core spray distribution header pipe 18, and lower clamp body 46A and includes a clamp bolt 124A, a clamp nut 126A, and a crimp collar 128A. Particularly, clamp bolt 124A extends through bolt openings 50A and 50B located in clamp bodies 44A and 46A respectively, and through bolt openings 130A and 130B machined into core spray distribution header pipe 18. Bolt 124A and clamp nut 126A include spherical portions 132A and 134A respectively. Bolt openings 50A and 50B are configured to conform to spherical portions 132A and 134A respectively. Spherical portions 132A and 134A are configured to minimize core spray system leakage and to prevent bending of clamp bolt 124A. Crimp collar 128A is coupled to clamp bolt head 125A to prevent bolt 124A from loosening because of normal operational reactor vibrations. Additionally, clamp nut 126A includes a square projection 136A configured to engage a square depression 138A located adjacent bolt opening 50A in upper clamp body 44A. Clamp bolt assembly 48B (shown in FIG. 2) is configured identical to assembly 48A with the exception that assembly 48B extends through upper clamp body 44B, bolt openings 130C and 130D (not shown) in distribution header pipe 20, and lower clamp body 46B (shown in FIG. 2).

T-box clamp apparatus 36 may be fabricated from any suitable material. For example, in one embodiment, all parts are fabricated from type 316 stainless steel except for clamp bolts 124A and 124B which are fabricated from XM19 stainless steel, and for cross-bolts 98A, 98B, 98C,and 98D, belleville washer stacks 106A, 106B, 106C, and 106D and cover bolts 114A, 114B, 114C, and 114D which are fabricated from INCONEL, X-750.

To assemble T-box clamp apparatus 36 on upper T-box 26 in boiling water nuclear reactor pressure vessel 10, bolt openings 130A, 130B, 130C, and 130D are first machined in distribution header pipes 18 and 20. Openings 130A, 130B, 130C, and 130D are located adjacent T-box 26. and are configured so as to align with clamp bolt openings 50A, 50B, 50C, and 50D in clamp bodies 44A, 44B, 46A, and 46B respectively and to receive clamp bolts 124A and 124B. Clamp bodies 44A and 46A are positioned on distribution header pipe 18 and clamped to a pipe 18 by clamp bolt and nut assembly 48A. Clamp bodies 44B and 46B are positioned on distribution header pipe 20 and clamped to a pipe 20 by clamp bolt and nut assembly 48B. Particularly, clamp bolt 124A is inserted through clamp bolt openings 50A, 50B, 130A, and 130B and secured with clamp nut 126A, and clamp bolt 124B is inserted through clamp bolt openings 50C, 50D, 130C, and 130D and secured with clamp nut 126B. Crimp collars 128A and 128B are coupled to clamp bolt heads 125A and 125B to prevent loosening of clamp bolt assemblies 48A and 48B during normal reactor operations.

Upper strong-back body 76 is positioned adjacent T-box 26 so that tongues 92A and 92B engage grooves 62A and 62B in upper clamp bodies 44A and 44B. Upper strong-back body 76 is coupled to upper clamp bodies 44A and 44B with cross bolts 98A and 98B respectively. Cross-bolts 98A and 98B extend through belleville washer stacks 106A and 106B, bolt openings 100A and 100B in flanges 56A and 56B of upper clamp bodies 44A and 44B respectively, and threadingly engage bolt openings 104A and 104B in upper strong-back body 76. Likewise, lower strong-back body 78 is coupled to upper clamp bodies 46A and 46B with cross bolts 98C and 98D respectively. Cross-bolts 98C and 98D extend through belleville washer stacks 106C and 106D, bolt openings 100C and 100D in flanges 68A and 68B of lower clamp bodies 46A and 46B respectively, and threadingly engage bolt openings 104C and 104D in lower strong-back body 78. Belleville washer covers 108A, 108B, 108C, and 108D are crimped to bolts 98A, 98B, 98C, and 98D to prevent loosening.

Cover plate 80 is then coupled to upper and the lower strong-back bodies 76 and 78 with cover bolts 114A, 114B, 114C, and 114D that extend through bolt openings 116A, 116B, 116C, and 116D in cover plate 80 and threadingly engage corresponding bolt openings 118A, 118B, 118C, and 118D in upper and lower strong-back bodies 76 and 78. Crimp collars 120A, 120B, 120C, and 120D are coupled to cover bolts 114A, 114B, 114C, and 114D respectively to prevent cover bolts 114A, 114B, 114C, and 114D from loosening because of normal operational reactor vibrations.

The above described T-box clamp apparatus 36 provides structural integrity to T-box 26 and distribution header pipes 18 and 20 which diverge from T-box 26. T-box clamp apparatus 36 applies compressive forces to the T-box and pipes 18 and 20 to hold pipes 18 and 20 together in the event that one or more welds fail. Apparatus 36 ensures that the core spray system delivers the necessary volumetric flowrate to the reactor core in the event of a loss of coolant accident.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A clamp apparatus for clamping a T-box to a core spray distribution header in a boiling water nuclear reactor pressure vessel, the T-box including a cover, the core spray distribution header including a first core spray distribution header pipe and a second core spray distribution header pipe, said clamp apparatus comprising:

a first clamp assembly configured to clamp to the first distribution header pipe, said first clamp assembly comprising an upper clamp body, a lower clamp body, and a clamp bolt and nut assembly;

a second clamp assembly configured to clamp to the second distribution header pipe, said second clamp assembly comprising an upper clamp body, a lower clamp body, and a clamp bolt and nut assembly; and an upper strong-back body, a lower strong-back body, and a cover plate, said upper strong-back body configured to conform to the shape of the T-box and to couple to said upper clamp of said first clamp assembly and to said upper clamp of said second clamp assembly, said lower strong-back body configured to conform to the shape of the T-box and to couple to said lower clamp of said first clamp assembly and to said lower clamp of said second clamp assembly.

2. A clamp apparatus in accordance with claim 1 wherein each said upper and each said lower clamp body configured to conform to the curvature of the header pipes and comprises a clamp bolt opening extending therethrough.

3. A clamp apparatus in accordance with claim 1 wherein each said upper clamp body and each said lower clamp body of said first clamp assembly and said second clamp assembly comprise an elongate member having a first end and a second end, a first flat side and a second side configured to conform to the curvature of the header pipes, said first side comprising a flange depending therefrom, said flange located so as to divide said first side into a first flat portion and a second flat portion, said first flat portion comprising a groove extending longitudinally from said first end of said elongate member to said flange.

4. A clamp apparatus in accordance with claim 3 wherein said upper strong-back body and said lower strong-back body each comprise an elongate member having a first end and a second end, a flat first portion, a curved second portion, and a flat third portion, said first and third portions in substantial alignment, each said first portion, said second portion, and said third portion having a first side and a second side, said second side of said second portion configured to conform to the curvature of the T-box, said second side of said first portion comprising a tongue extending longitudinally from said first end of said elongate member to said second portion, said second side of said third portion comprising a tongue extending longitudinally from said second end of said elongate member to said second portion, said tongue of said first portion and said tongue of said third portion of said upper strong-back body configured to engage said groove of said first and said second upper clamp body respectively, and said tongue of said first portion and said tongue of said third portion of said lower strong-back body configured to engage said groove of said first and said second lower clamp body respectively.

5. A clamp apparatus in accordance with claim 4 further comprising a plurality of cross-bolts.

6. A clamp apparatus in accordance with claim 5 wherein said first end and said second end of each said upper and said lower strong-back body comprises a bolt opening configured to engage said cross-bolt, and said flange of said upper and said lower clamp body of said first clamp assembly and said second clamp assembly comprises a bolt opening extending therethrough configured to receive said cross-bolt.

7. A clamp apparatus in accordance with claim 6 wherein each said bolt opening in each said flange of said upper and lower clamp body of said first and said second clamp assembly is configured to be in substantial alignment with said bolt opening in said corresponding end of said upper and said lower strong-back body.

8. A clamp apparatus in accordance with claim 4 wherein said cover plate is coupled to said upper and said lower strong-back body, said cover plate configured to engage the T-box cover.

9. A clamp apparatus in accordance with claim 8 wherein said cover plate comprises a flat member having a substantially cross shape configured to couple to said upper and said lower strong-back body.

10. A clamp apparatus in accordance with claim 6 further comprising a plurality of coned-disc spring stacks coupled to said cross-bolts, each said stack engaging a corresponding upper or lower clamp body flange.

11. A clamp and core spray distribution header assembly for a boiling water nuclear reactor pressure vessel, said assembly comprising:

a first core spray distribution header pipe;

a second core spray distribution header pipe;

a T-box, said first and second core spray header pipes extending from said T-box; and a clamp apparatus comprising:

a first clamp assembly clamped to said first distribution header pipe, said first clamp assembly comprising an upper clamp body, a lower clamp body, and a clamp bolt and nut assembly;

a second clamp assembly clamped to said second distribution header pipe, said second clamp assembly comprising an upper clamp body, a lower clamp body, and a clamp bolt and nut assembly; and a clamp strong-back assembly coupled to said first and said second clamp assemblies, said strong-back assembly comprising an upper strong-back body, a lower strongback body, and a cover plate, said upper strong-back body configured to conform to the shape of the T-box and to couple to said upper clamp of said first clamp assembly and to said upper clamp of said second clamp assembly, said lower strong-back body configured to conform to the shape of the T-box and to couple to said lower clamp of said first clamp assembly and to said lower clamp of said second clamp assembly.

12. An assembly in accordance with claim 11 wherein each said upper and each said lower clamp body configured to conform to the curvature of said header pipes and comprises a clamp bolt opening extending therethrough.

13. An assembly in accordance with claim 11 wherein each said upper clamp body and each said lower clamp body of said first clamp assembly and said second clamp assembly comprise an elongate member having a first end and a second end, a first flat side and a second side configured to conform to the curvature of said header pipes, said first side comprising a flange depending therefrom, said flange located so as to divide said first side into a first flat portion and a second flat portion, said first flat portion comprising a groove extending longitudinally from said first end of said elongate member to said flange.

14. An assembly in accordance with claim 13 wherein said upper strong-back body and said lower strong-back body each comprise an elongate member having a first end and a second end, a flat first portion, a curved second portion, and a flat third portion, said first and third portions in substantial alignment, each said first portion, said second portion, and said third portion having a first side and a second side, said second side of said second portion configured to conform to the curvature of said T-box, said second side of said first portion comprising a tongue extending longitudinally from said first end of said elongate member to said second portion, said second side of said third portion comprising a tongue extending longitudinally from said second end of said elongate member to said second portion, said tongue of said first portion and said tongue of said third portion of said upper strong-back body configured to engage said groove of said first and said second upper clamp body respectively, and said tongue of said first portion and said tongue of said third portion of said lower strong-back body configured to engage said groove of said first and said second lower clamp body respectively.

15. An assembly in accordance with claim 14 wherein said clamp apparatus further comprises a plurality of cross-bolts.

16. An assembly in accordance with claim 15 wherein said first end and said second end of each said upper and said lower strong-back body comprises a bolt opening configured to engage said cross-bolt, and said flange of said upper and said lower clamp body of said first clamp assembly and said second clamp assembly comprises a bolt opening extending therethrough configured to receive said cross-bolt.

17. An assembly in accordance with claim 16 wherein each said bolt opening in each said flange of said upper and lower clamp body of said first and said second clamp assembly is in substantial alignment with said bolt opening in said corresponding end of said upper and said lower strong-back body.

18. An assembly in accordance with claim 16 wherein said clamp apparatus further comprises a plurality of coned-disc spring stacks coupled to said cross-bolts, each said stack engaging a corresponding upper or lower clamp body flange.

19. An assembly in accordance with claim 14 wherein said cover plate comprises a flat member having a substantially cross shape coupled to said upper and said lower strong-back body.

\* \* \* \* \*